(12) United States Patent
Andre et al.

(10) Patent No.: US 7,220,192 B2
(45) Date of Patent: May 22, 2007

(54) GOLF PRODUCTS AND PACKAGING FOR GOLF PRODUCTS WITH COLOR TRAVELING COATING

(75) Inventors: Kieran F. Andre, Fairhaven, MA (US); Colin W. Veitch, Fairhaven, MA (US); Calum H. Munro, Wexford, PA (US); Mark D. Merritt, Cranberry Township, PA (US)

(73) Assignee: Acushnet Company, Fairhaven, MA (US)

( * ) Notice: Subject to any disclaimer, the term of this patent is extended or adjusted under 35 U.S.C. 154(b) by 249 days.

(21) Appl. No.: 10/901,632

(22) Filed: Jul. 29, 2004

(65) Prior Publication Data

US 2004/0266560 A1    Dec. 30, 2004

Related U.S. Application Data

(63) Continuation-in-part of application No. 10/034,825, filed on Dec. 27, 2001, now Pat. No. 6,894,086.

(51) Int. Cl.
*A63B 37/00*    (2006.01)

(52) U.S. Cl. ....................... 473/351; 523/105
(58) Field of Classification Search ............... 473/351, 473/378
See application file for complete search history.

(56) References Cited

U.S. PATENT DOCUMENTS

| 4,991,851 | A | 2/1991 | Melesio ................... 273/213 |
| 5,875,891 | A | 3/1999 | Snell ..................... 206/315.9 |
| 6,044,970 | A | 4/2000 | Shinoda ................ 206/315.1 |
| 6,631,021 | B2 | 10/2003 | Smith et al. ............. 359/241 |
| 6,682,773 | B2 | 1/2004 | Medwick et al. ........ 427/154 |
| 2003/0060302 | A1* | 3/2003 | Rogers et al. ........... 473/282 |
| 2003/0125416 | A1 | 7/2003 | Munro et al. ............ 523/171 |

\* cited by examiner

*Primary Examiner*—Raeann Trimiew
(74) *Attorney, Agent, or Firm*—Mandi B. Milbank

(57) ABSTRACT

The present invention is directed to golf equipment packages using a coating that gives a color traveling effect. The color traveling coating can be applied to golf equipments such as golf balls, golf gloves and golf clubs, and to golf equipment display. In addition, because the coating reflects ultraviolet light, it can be coated on golf balls and golf clubs to prevent discoloration under ultraviolet light.

3 Claims, 3 Drawing Sheets

GOLF PRODUCTS AND PACKAGING FOR GOLF PRODUCTS WITH COLOR TRAVELING COATING

CROSS REFERENCE TO RELATED APPLICATION

This application is a continuation-in-part of U.S. patent application Ser. No. 10/034,825 filed Dec. 27, 2001 now U.S. Pat. No. 6,894,086, which is hereby incorporated by reference.

FIELD OF THE INVENTION

The present invention is directed to golf related products and packaging using color traveling technology to provide a unique look to golf ball, golf equipment, golf ball packaging and counter display.

BACKGROUND OF THE INVENTION

Unique, attractive golf balls, golf equipment, golf packaging and counter displays attract potential buyers. Attractive golf balls and equipment, and unique-looking packaging for golf balls and equipment convey high quality and make the merchandise more attractive.

U.S. Pat. No. 4,991,851 to Melesio discusses using a solid layer of light-reflective glass beads to coat a golf ball so that it can be used at night. When illuminated by a light source, it can be readily located and can be used at night.

U.S. Pat. No. 5,875,891 to Snell relates to packaging for golf balls that prevents moisture absorption during storage. This reference discloses a package that includes a sealing member, which is a moisture barrier forming an airtight seal around the golf balls.

U.S. Pat. No.6,044,970 to Shinoda discloses a golf ball package having a holographic display. The hologram sheet comprises a plastic film covering a reflective surface that consists of evaporated metal film with fine irregularities. Depending on the viewing angle, the hologram sheet becomes iridescently colored. In addition, there are also formed, within the irregularly reflective area, both a first regularly reflecting area which reflects incident light from a predetermined angle for displaying an external view of the golf ball, and a second regularly reflecting area which regularly reflects incident light from a different angle for displaying the internal structure of the golf ball. However, this reference requires the use of metal as reflective surfaces to display holographic images.

There remains a need for other methods to make golf balls, golf equipment, and golf packaging to look unique, more attractive and desirable.

SUMMARY OF THE INVENTION

The present invention is directed to package for golf equipment comprising a color traveling coating on at least a portion of the package. The coating comprises a colorant in particulate form, wherein the colorant comprises an ordered periodic array of particles held in a matrix. The particle has a first refractive index, and the matrix has a second refractive index. The refractive indices are different by at least 0.01. The coating gives the golf equipment package a color traveling effect. The refractive indices are preferably different by at least 0.05, and more preferably by at least 0.1.

The particles can be organic polymeric material selected from the group consisting of polyurethane, polycarbonate, polystyrene, acrylic polymer, alkyd polymer, polyester, siloxane polymer, polysulfide, epoxy-containing polymer, and polymer derived from an epoxy-containing polymer.

The matrix can be a polymeric material selected from the group consisting of polyurethane, acrylic polymer, alkyd polymer, polyester, siloxane-containing polymer, polysulfide, epoxy-containing polymer, and polymer derived from epoxy-containing polymer.

The golf equipment inside the package includes, but is not limited to a golf ball, a golf club, golf glove, golf shoe, golf bag, and a golf accessory.

The coating can have a thickness of 0.5 micron to 100 microns, and more preferably a thickness of 3 microns to 10 microns.

The color traveling coating can also be applied directly to golf equipment and golf display counters. In addition, the coating can be used to reflect ultraviolet light, thus decreasing discoloration of golf balls and golf clubs by ultraviolet light.

DETAILED DESCRIPTION OF THE INVENTION

Figure 1:
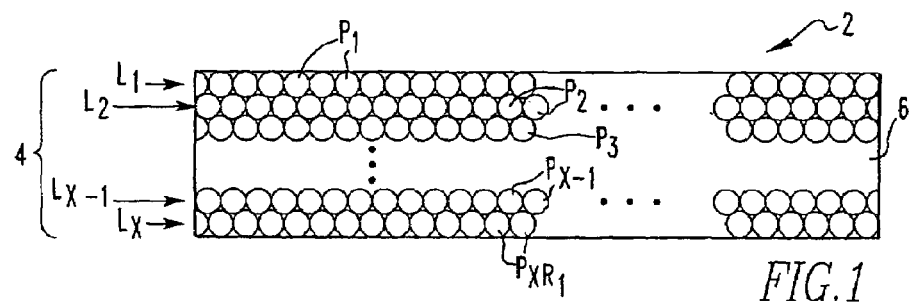
FIG. 1 is a cross-section of a colorant made in accordance with the present invention.

As discussed in the parent application, which was published as U.S. Pat. App. Pub. No. 2003/0125416 and is incorporated herein by reference in its entirety, color traveling technology provides unique appearance to products. Color traveling technology can be applied to golf balls, golf equipment, golf ball packaging and counter display.

Color traveling technology, which is very different from holography, involves goniochromaticity. Goniochromaticity is the effect of the perceived varying color as the angle of illumination or observation varies.

The present invention is directed to a colored coating composition comprising a resinous binder and a color effect colorant in particulate form. The colorant includes an ordered periodic array of particles held in a polymeric matrix wherein a difference in refractive index between the particles and the polymeric matrix is at least about 0.01. The colorant reflects visible light according to Bragg's law to yield a goniochromatic effect, or a color traveling effect to the coating composition. As a result, objects coated with such compositions will show color traveling effects.

In this invention, goniochromatic pigments give a unique appearance to golf balls, golf equipment, golf packaging and display counters. Goniochromatic pigments have been used in automotive coatings, decorative coatings, plastic pigmentation, and printing inks such as security inks, textiles, and cosmetics. Their optical effect is a result of the directional reflection of light from predominantly sheet-like particles that have a structured refractive index contrast, provided that the length scale of which is comparable to the wavelength of light.

In general, the pigments are known as metallic effect pigments (e.g., aluminum, zinc, copper or alloys thereof) or interference pigments (for example, based on titanium dioxide-coated mica, such as muscovite, phlogopite, and biotite). Metallic effect pigments oriented in a coating will exhibit goniochromaticity as a result of the incident light being reflected directionally by the predominantly sheet-like particles. The perceived color (lightness and/or hue and/or chroma) varies with respect to the angle of illumination or observation.

On the other hand, interference pigments may comprise a single plate-like layer, or a multilayer structure. The color perceived is affected by interference in the thin layer or layers, and optionally also by absorption by a chromophore (an organic moiety or inorganic complex that absorbs wavelengths of light in the visible and/or UV ranges) or a color center. A color center is an electron hole pair that results from a lattice defect in a crystalline solid-state material and which absorbs wavelengths in the visible and/or UV ranges. Interference, with or without absorption, results in a multiplicity of hue that is dependent on the thickness of one or more thin layers and the effective refractive index of one or more thin layers.

In this invention, radiation diffractive materials in particulate form are applied to golf balls, golf equipment, golf packaging and display counters. The particulate form may act as color effective pigments, termed "colorants". All references to "colorant" hereinafter are equally applicable to the general characterization of the present invention as radiation diffractive material except that "colorants" specifically reflect radiation in the visible spectrum while radiation diffractive material reflects any wavelength of electromagnetic radiation.

As shown in FIG. 1, the colorant 2 includes an array 4 of particles $P_1, P_2, \ldots P_{x-1}$, and $P_x$ held in a polymeric matrix 6. The particles are arranged in layers $L_1, L_2, \ldots L_{x-1}$, and $L_x$ stacked upon each other so that the surfaces of the particles $P_1$–$P_x$ contact each other. Each particle contacts at least one more particle.

The colorant includes an ordered periodic array of particles held in a matrix wherein the difference in refractive indices of the matrix and the particles is at least about 0.01, preferably at least about 0.05, and, more preferably at least about 0.1, discussed in detail below.

The matrix may be an organic polymer, such as polyurethane, polycarbonate, polystyrene, acrylic, alkyd, polyester, siloxane, polysulfide, epoxy or mixtures thereof and, preferably, is cross-linked. Alternatively, the matrix may be an inorganic polymer, such as a metal oxide (e.g. alumina, silica or titanium dioxide) or a semiconductor (e.g. cadmium selenide).

In another aspect of this invention, the array of particles may range from about 0.5 micron to about 100 microns thick. For ease of use as a colorant in a form analogous to a conventional effect pigment particle, the array of particles is preferably between about 3 microns to about 10 microns thick.

The "aspect ratio", i.e. the ratio of the width to the height, of the particles in the array is at least about 2, more preferably about 5 to 100, and most preferably about 10. The particles in the array are preferably similarly sized and differ in size by up to about 5 to 15%. Typically, the array includes at least about 5 layers of the particles, and more preferably about 10 to 30 layers of the particles.

The particles may be composed of an organic polymer, such as polyurethane, polycarbonate, polystyrene, acrylic polymer, alkyd polymer, polyester, siloxane, polysulfide, epoxy containing polymer or polymer derived from an epoxy-containing polymer and, preferably, is cross-linked.

Alternatively, the particles may be composed of an inorganic material, such as a metal oxide (e.g. alumina, silica or titanium dioxide) or a semiconductor (e.g. cadmium selenide).

The charged particles are purified from the dispersion by means, such as ultrafiltration, dialysis or ion exchange to remove undesired materials, such as unreacted monomer, small polymers, water, initiator, surfactant, unbound salt, and grit (agglomerated particles) to produce a monodispersion of the charged particles. Ultrafiltration is a preferred technique for purifying the charged particles. It has been found that following an ultrafiltration step, the charged particles are ordered into the array. Upon removal of the excess raw materials, by-products, solvent, and the like, the particles naturally align themselves into the array due to their similar (repellant) charges. When in a dispersion with other materials (e.g. salts or by-products) the repelling force of the charged particles is mitigated. However, when the dispersion is purified to essentially contain only the charged particles, the particles readily repel each other and form an ordered array.

To prepare an array of particles, the particles are fixed in the polymeric matrix by providing a dispersion of the particles, bearing a similar charge, in a carrier, applying the dispersion onto a substrate, evaporating the carrier to produce an ordered periodic array of the particles on the substrate, coating the array of particles with the polymer, and curing the polymer to fix the array of particles within the polymer. The dispersion may contain about 1 to about 70 vol. % of the charged particles, preferably about 30 to about 65 vol. % of the charged particles.

The fixed array is removed from the substrate and converted into particulate form. The substrate may be a flexible material (such as a polyester film) or an inflexible material (such as glass). The dispersion can be applied to the substrate by dipping, spraying, brushing, roll coating, curtain coating, flow coating or die coating to a desired thickness, preferably a maximum thickness of about 20 microns, more preferably a maximum of about 10 microns, and most preferably a maximum of about 5 microns. The fixed array of particles is removed from the substrate in the form of an extended film or in the form of flakes that may be suspended in a coating composition. The particles are arranged in stacked upon each other so that the surfaces of the particles contact each other. Each particle contacts at least one other particle.

The polymeric matrix preferably is a curable polymeric composition, such as a UV curable composition with high acrylate content. Suitable polymers for the matrix include polyurethanes, acrylic polymers, alkyd polymers, polyesters, siloxane-containing polymers, polysulfides, epoxy-containing polymers, and polymers derived from epoxy-containing polymers. The polymeric matrix may comprise substantially one polymer material or may be a mixture of a plurality of suitable polymer materials. A list of representative materials for each of the particles and the polymer matrix and their refractive indices may be found in Table 1 of the parent case.

The particles diffract light according to Bragg's law. An incident ray of light is partially reflected at a first layer of first particles. A portion of the incident ray is reflected as first reflected ray that makes an angle with the plane of the first layer of the particles. The other portion of the incident ray is transmitted through the first layer of particles as ray. The ray is partially reflected from the second layer of the array as second reflected ray that also makes an angle with the plane of the second layer of the particles. The second reflected ray is in phase with the first reflected ray.

The effective refractive index n is closely approximated as a volume average of the refractive index of the particles (referred to as $RI_{particles}$) and the refractive index of the polymeric matrix (referred to as $RI_{matrix}$) present in the colorant according to the equation:

$$n=(\text{vol. \% particles}/100) \times RI_{particles} + (\text{vol. \% polymer}/100) \times RI_{matrix}$$

For example, polystyrene particles have a refractive index of about 1.6. Polymethylmethacrylate has an index of refraction of about 1.49. For a colorant having an equal amount by volume of polystyrene particles and a polymethylmethacrylate matrix, the effective refractive index n of the colorant is 1.545.

Figure 2:
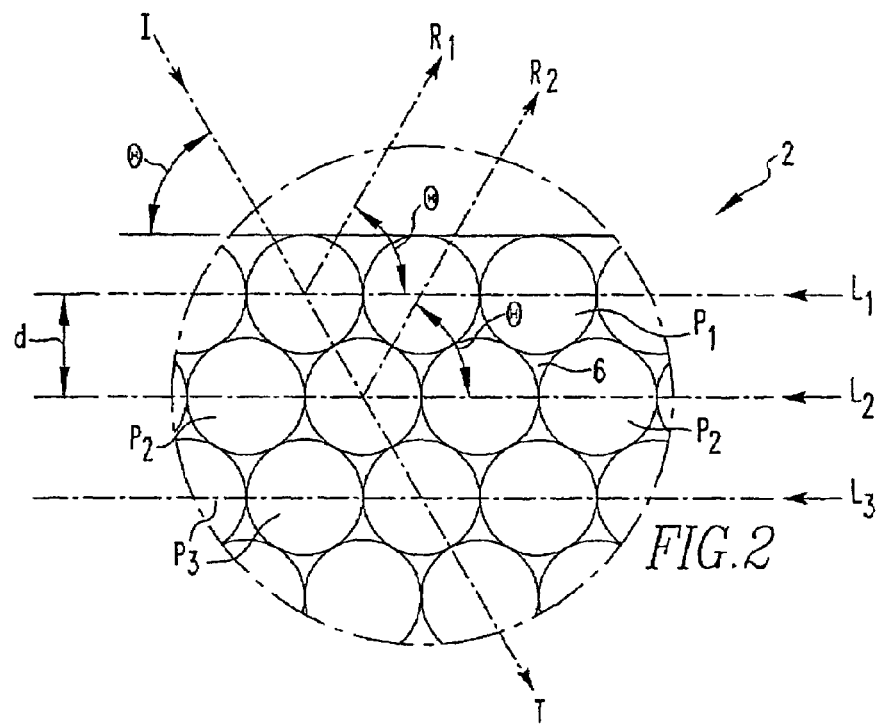
FIG. 2 is a detailed view of the colorant of FIG. 1 showing Bragg diffraction of visible light at one viewing angle.

FIG. 2 shows reflection of light from two layers $L_1-L_x$, of particles $P_1-P_2$. The interference effect, i.e. the intensity of the reflected light, may be increased by increasing the number of layers $L_1-L_x$, in the array 4. While at least two layers $L_1-L_2$ are required to induce a Bragg effect on the incident light, preferably at least about five and, more preferably about five to ten layers $L_1-L_x$ of particles $P_1-P_x$ are desired to achieve a desired intensity of reflected light. Fewer layers $L_1-L_x$ of particles $P_1-P_x$ reflect less light, thereby decreasing the intensity of the reflected light and tending to broaden the wavelength of the reflected light. These effects, associated with two to four layers $L_1-L_x$ may be compensated for by increasing the difference between the $RI_{particles}$ and the $RI_{matrix}$. More than about ten layers $L_1-L_x$ may be used in certain applications where higher intensity reflected light is desired.

The average particle size of the particles is about 0.01 to about 1 micron, preferably about 0.06 to about 0.5 micron. The distance between the layers is controlled substantially by the size of the particles. If the particle size varies within a layer or if the particle size varies between layers, the spacing between the layers will vary through the array. As noted above, the wavelength of light reflected under the Bragg condition is a function of the spacing between the layers. A distribution in particle size causes variation in the wavelength of reflected light that is viewed as a broad bandwidth of light exhibiting a blend of colors instead of a clean, sharp color. Therefore, in order to maintain a regular array, the particles are similarly sized and, preferably, differ in size from each other by about 5 to about 15%.

The colorant preferably has a thickness no greater than about 20 microns, preferably less than about 10 microns, more preferably less than about 5 microns. Colorants substantially thicker than about 20 microns may be difficult to properly disperse and align in a coating. Colorants substantially thicker than about 20 microns may also cause a roughening of the surface of a typical coating, causing a reduction in the gloss of the coating.

In this invention, a particular color of reflected light may be selected. For example, if the reflected light in the visible spectrum is to be shifted to blue (to shorter wavelengths), the spacing between the layers of the particles and/or the effective refractive index "n" may be decreased. Likewise, a red color shift (to longer wavelengths) of reflected light may be achieved by larger spacing between the particle layers and greater effective refractive index. In addition, by using particles with a narrow particle size distribution, the wavelengths of reflected light have relatively narrow bandwidths and exhibit a clean, sharp color.

The present invention is also applicable to wavelengths of electromagnetic radiation outside the visible spectrum, such as ultraviolet radiation or infrared radiation. The ordered array in the matrix may be used to reflect such radiation to prevent or minimize exposure of a substrate on which the array is positioned to that radiation. It may be useful to coat golf balls or clubs with a coating having a spacing between the layers of particles or effective refractive index "n" in the ultraviolet range to protect the balls and clubs from discoloration by ultraviolet light.

Figure 3:
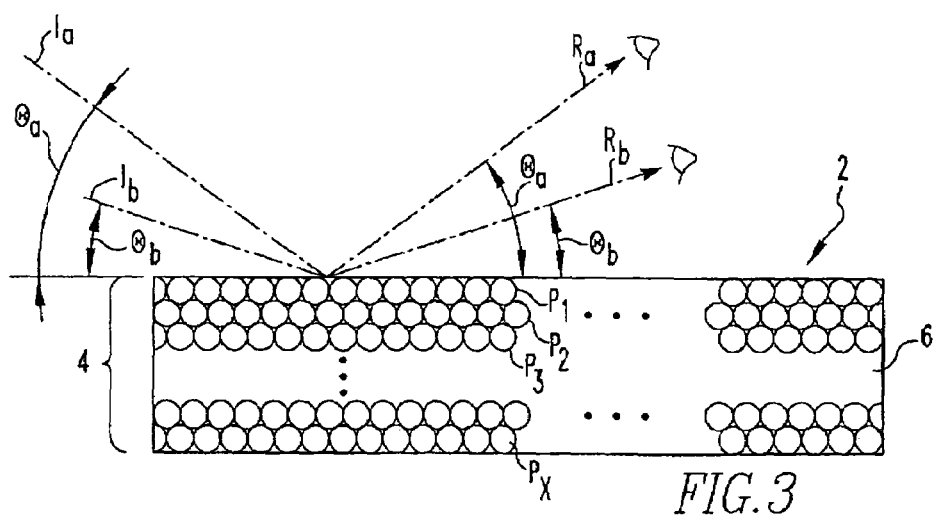
FIG. 3 is a cross-section of the colorant shown in FIG. 1 showing Bragg diffraction of visible light at two viewing angles.

FIG. 3 depicts the goniochromatic effect of the colorant. Multiple rays of incident light strike the colorant 2. Portions of the light of incident rays $I_a$ and $I_b$ are reflected from the colorant 2 as reflected rays $R_a$ and $R_b$. The angles $\theta_a$ and $\theta_b$ with which incident rays $I_a$ and $I_b$ strike the colorant 2 are different, hence the wavelength of light of reflected ray $R_a$ is different from the wavelength of light of reflected ray $R_b$ according to Equation 1. A goniochromatic effect is produced because the color of light of reflected ray $R_a$ visible from one viewing angle differs from the color of light of reflected ray $R_b$ visible from another viewing angle.

In one embodiment of the invention, nanoscale particles may be used when the refractive index of the particles ($RI_{particles}$) is close to the refractive index of the polymer matrix ($RI_{matrix}$) In this case, the polymer matrix composition may be adjusted to sufficiently change $RI_{matrix}$ to increase the difference between $RI_{particles}$ and $RI_{matrix}$ by adding nanoscale particles (sized about 1 to about 50 nm) to the matrix. The nanoscale particles have particle sizes less than the wavelength of visible light and, thus, do not substantially reflect or scatter light.

Suitable materials for the nanoscale particles that increase the effective $RI_{matrix}$ include metals (for example, gold, silver, platinum, copper, titanium, zinc, nickel), metal oxides (for example, aluminum oxide, cerium oxide, zinc oxide, titanium dioxide), mixed metal oxides, metal bromides, and semiconductors. Suitable materials for the nanoscale particles that decrease the effective $RI_{matrix}$ include metal oxides (for example silica), mixed metal oxides, and metal fluorides (for example, magnesium fluoride, calcium fluoride). Nanoscale air bubbles may also be produced in the polymer matrix to decrease $RI_{matrix}$. Similarly, the $RI_{particles}$ may be adjusted by adding nanoscale particles to the particles.

Figure 4:
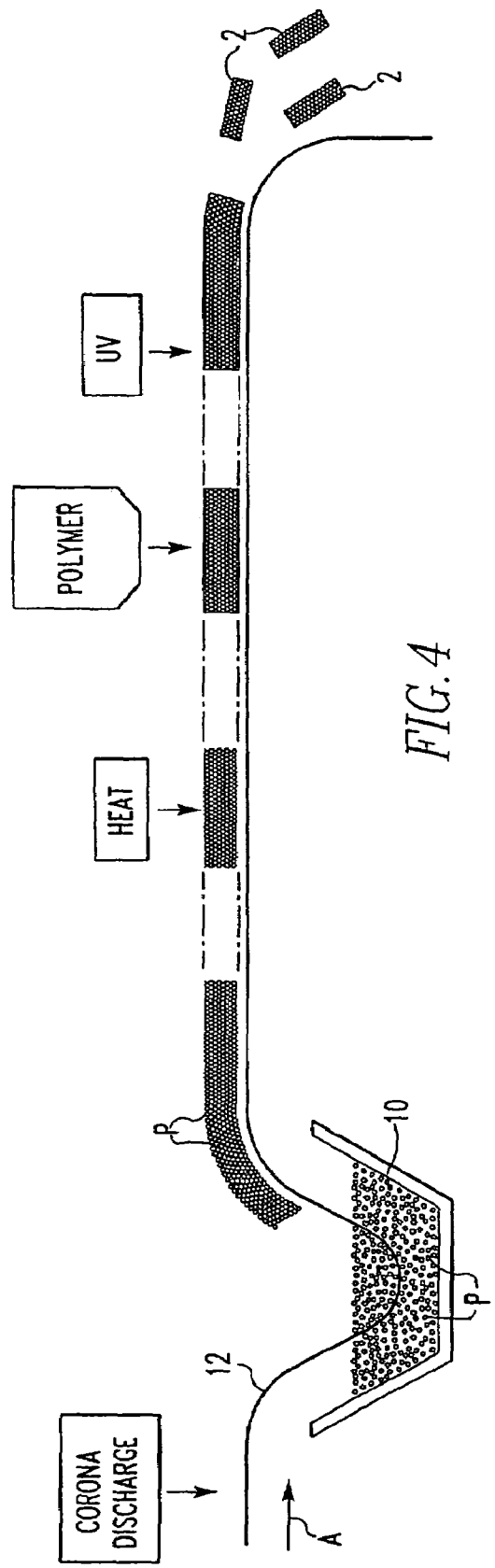
FIG. 4 is a schematic of a process for preparing the colorant of the present invention.

The preparation of the colorant of the present invention, as described in FIG. 4, involves the steps of (a) dispersing the particles in a carrier, (b) spreading the particles on a substrate, (c) forming a periodic array of the particles on the substrate, (d) drying the carrier, (e) applying a polymeric matrix to the particles, (f) curing the polymeric matrix composition, and (g) removing the polymeric matrix composition from the substrate as flakes of colorants or as a continuous film.

The colorant flakes are suitable for use as pigment particles in a coating composition for golf balls, golf equipment, golf packaging and display counters. Alternatively, the colorant flakes can be used in clear coatings (i.e., those that produce cured films having substantial transparency) or they can be added to other pigments and/or dyes in colored coatings. The coatings that can incorporate the colorants of the present invention include, but are not limited to, primers, basecoats, and topcoats, as well as any one or more of the coatings in a multi-coat combination.

The coating compositions can further include one or more additives, such as UV absorbers and stabilizers, rheology control agents, surfactants, catalysts, film build additives, fillers, flatting agents, deformers, microgels, pH control additives, and other pigments. Along with the colorants of the present invention, it may be useful in some cases to also include conventional pigments and dyes. These include micas, iron oxides, carbon black, titanium dioxide, aluminum flakes, bronze flakes, coated mica, nickel flakes, tin flakes, silver flakes, copper flakes, and combinations thereof. Other organic coloring agents (i.e., dyes or organic pigments) could also be included. If it is desired to match the specific gravity of the polymeric and solvent components of the coating composition, the colorant content of the composition will have essentially no elemental metal components, and, preferably, essentially no metal oxide components as well.

In one embodiment of this invention, the coating that includes the color effect colorant can be a basecoat, over which is applied a clearcoat that does not contain the colorant. The components of the basecoat and those of the clearcoat can be any of those discussed above.

In another alternative embodiment of this invention, the coating that includes the colorant can be a clearcoat that is applied over a basecoat that also contains colorant. The components of the basecoat and those of the clearcoat can be any of those discussed above.

In yet another alternative embodiment, the coating that includes the color effect colorant can be a clearcoat that is applied over a basecoat that does not contain colorant, and over which is applied another clearcoat that does not contain colorant. The components of the basecoat and those of the two clearcoats can be any of those discussed above.

The liquid or powder slurry coatings can be applied to the surface to be coated by any suitable coating process well-known to those skilled in the art, for example by dip coating, direct roll coating, reverse roll coating, curtain coating, spray coating, brush coating, gravure coating, flow coating, slot-die coating, ink-jet coating, electrodeposition, and combinations thereof. Powder coatings are generally applied by electrostatic deposition.

The present invention also includes use of the colorant (or radiation reflective material) in other types of carriers than a film-forming component. Other non-limiting uses of the colorant include as a component dispersed in a cosmetic or as a pigment impregnated into plastic.

The present invention is directed to a golf equipment package comprising on at least a portion thereof a color traveling coating having a composition with a colorant in a matrix with a difference of the refractive index of at least 0.01 such that the coating gives a color traveling effect to the package.

The present invention is also directed to a color traveling golf equipment or a portion thereof comprising a composition with a colorant in a matrix with a difference of the refractive index of at least 0.01 such that the coating gives a color traveling effect to the golf equipment or the portion thereof. The color traveling golf equipment may be a golf ball, a golf club, a golf driver head, a golf glove, or a golf shoe. In addition, other golf-related merchandises such as golf ball nameplates, side stamps, and custom logo imprints can be coated with the color traveling coating.

The color traveling composition may be supplied as a film, which can be adhered to golf equipment. In a different embodiment, the color traveling film may be chopped up and distributed in a UV clear coat.

The present invention is further directed to a color traveling display counter or flooring for the sale of golf equipment, comprising a composition with a colorant in a matrix with a difference of the refractive index of at least 0.01 such that the coating gives a color traveling effect to the display counter or flooring.

The color traveling coating on golf balls, golf equipment, golf packaging and display counters gives these items unique appearance. The color traveling technology enhances the shelf presence of golf equipment and packaging by making them more visible and noticeable. As a result, these merchandises are more attractive to potential customers, and more distinct and different from competitive products by the perception of superiority in technology and quality.

The color traveling coating according to the present invention may be applied by painting, or spraying of the coating composition to the desired area on the surface of the package, the golf equipment, the display counter, and the flooring in the vicinity of the display counter.

Alternatively, the color-changing paints known as SpectraFX of the Alsa Corporation (discussed at http://www.alsacorp.com/products/spectrafx/spectrafx_prodinfo.htm) may be used as an embodiment for the coating of packaging, golf equipment, display counters, and flooring in the vicinity of the display counters. Without being limited to any particular theory, the SpectraFX flakes give rise to color changes by absorbing light, not reflecting it. Additionally, liquid crystal pigments may also have color traveling effects. By varying the background color, the two available options of SpectraFX flakes, i.e. (a) copper/patina, and (b) blue/emerald, are each capable of changing into many colors.

Additionally, SecureShift Technology of the Flex Products, Inc. (available at http://www.secureshift.com/index.php?sec=brand&art=0029) uses the interference of light to change color as seen by the viewers when either the angle of illumination or the angle of viewing is changed. The SecureShift Technology may be used as an embodiment for the coating of packaging, golf equipment, display counters and flooring in the vicinity of the display counters. Essentially, the SecureShift Technology requires both an opaque reflective layer as well as a glass-like layer in ultra thin films to give color shifting effect. Examples of shifting of colors include (a) from red through gold into green, (b) from blue through red into bronze, (c) from silver through green into purple, and (d) from green through blue into purple.

Other than in the operating examples, or unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the preferred embodiments of the present invention, it is appreciated that numerous modifications and other embodiments may be devised by those skilled in the art. Examples of such modifications include slight variations-of the numerical values discussed above. Hence, the numerical values stated above and claimed below specifically include those values and the values that are approximately or nearly close to the stated and claimed values. Therefore, it will be understood that the appended claims are intended to cover all such modifications and embodiments, which would come within the spirit and scope of the present invention.

What is claimed is:

1. A color traveling golf equipment comprising a color traveling coating on at least a portion of the golf equipment, wherein the color traveling coating reflects light at different perceived color as angle of illumination or angle of observation varies, wherein the color traveling coating comprises a colorant formed from an ordered periodic array of particles held in a matrix, and wherein a difference between a first refractive index of the particles and a second refractive index of the matrix is at least 0.01.

2. The color traveling golf equipment of claim 1, wherein the particles comprise a polymer selected from the group consisting of polyurethane, polycarbonate, polystyrene, acrylic polymer, alkyd polymer, polyester, siloxane polymer, polysulfide, epoxy-containing polymer, polymer derived from an epoxy-containing polymer, alumina, silica, titanium dioxide, cadmium selenide, and a combination thereof.

3. The color traveling golf equipment of claim 1, wherein the matrix comprises a polymer selected from the group consisting of polyurethane, acrylic polymer, alkyd polymer, polyester, siloxane-containing polymer, polysulfide, epoxy-containing polymer, polymer derived from epoxy-containing polymer, alumina, silica, titanium dioxide, cadmium selenide, and a combination thereof.

* * * * *